(12) United States Patent
Kim et al.

(10) Patent No.: US 10,029,946 B2
(45) Date of Patent: Jul. 24, 2018

(54) CEMENT COMPOSITION ADDITIVE CONTAINING POLYCARBOXYLIC ACID COPOLYMER, ZINC OXIDE PARTICLES AND GLUCONATE

(71) Applicant: LG CHEM, LTD., Seoul (KR)

(72) Inventors: Hyo Min Kim, Daejeon (KR); Chang Bum Ko, Daejeon (KR); Imgyu Kim, Daejeon (KR); Dong Jo Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/329,462

(22) PCT Filed: Oct. 22, 2015

(86) PCT No.: PCT/KR2015/011182
§ 371 (c)(1),
(2) Date: Jan. 26, 2017

(87) PCT Pub. No.: WO2016/072646
PCT Pub. Date: May 12, 2016

(65) Prior Publication Data
US 2017/0233292 A1    Aug. 17, 2017

(30) Foreign Application Priority Data

Nov. 4, 2014 (KR) .................. 10-2014-0152059

(51) Int. Cl.
| | | |
|---|---|---|
| C04B 24/26 | (2006.01) | |
| C04B 24/10 | (2006.01) | |
| C04B 22/06 | (2006.01) | |
| C04B 28/04 | (2006.01) | |
| C04B 14/06 | (2006.01) | |
| C04B 18/02 | (2006.01) | |
| C04B 40/00 | (2006.01) | |
| C04B 111/00 | (2006.01) | |
| C04B 103/30 | (2006.01) | |
| C04B 103/24 | (2006.01) | |

(52) U.S. Cl.
CPC .......... *C04B 24/2664* (2013.01); *C04B 14/06* (2013.01); *C04B 18/02* (2013.01); *C04B 22/06* (2013.01); *C04B 24/10* (2013.01); *C04B 28/04* (2013.01); *C04B 40/0042* (2013.01); *C04B 2103/24* (2013.01); *C04B 2103/302* (2013.01); *C04B 2111/00637* (2013.01); *C04B 2201/50* (2013.01)

(58) Field of Classification Search
CPC ..... C04B 24/2664; C04B 24/10; C04B 22/06; C04B 28/04; C04B 14/06; C04B 18/02; C04B 40/0042; C04B 2111/00637
USPC .......................................................... 524/5
See application file for complete search history.

(56) References Cited

U.S. PATENT DOCUMENTS

| | | | | |
|---|---|---|---|---|
| 6,939,402 | B2 * | 9/2005 | Choi ............... | C04B 24/165 106/724 |
| 2002/0193547 | A1 * | 12/2002 | Yuasa .............. | C04B 24/2658 526/312 |

FOREIGN PATENT DOCUMENTS

| | | | |
|---|---|---|---|
| CN | 101891414 | * | 11/2010 |
| CN | 103288372 A | | 9/2013 |
| CN | 104119025 A | | 10/2014 |
| KR | 10-2003-0065580 A | | 8/2003 |
| KR | 10-2004-0009222 A | | 1/2004 |
| KR | 10-2004-0013479 A | | 2/2004 |
| KR | 100944238 | | 2/2010 |
| KR | 100944238 B1 | * | 2/2010 |
| KR | 10-2010-0070909 A | | 6/2010 |
| KR | 10-2014-0025083 A | | 3/2014 |
| KR | 1020140031145 | | 3/2014 |

OTHER PUBLICATIONS

Translation of CN 101891414, Nov. 24, 2010. (Year: 2010).*

* cited by examiner

*Primary Examiner* — Hui Chin
(74) *Attorney, Agent, or Firm* — Lerner, David, Littenberg, Krumholz & Mentlik, LLP

(57) ABSTRACT

Disclosed are a cement composition additive with improved compressive strength and workability, including a polycarboxylic acid copolymer and/or a salt thereof, zinc oxide particles, and a predetermined amount of gluconic acid and/or a salt thereof, and a cement composition containing the same.

17 Claims, No Drawings

CEMENT COMPOSITION ADDITIVE CONTAINING POLYCARBOXYLIC ACID COPOLYMER, ZINC OXIDE PARTICLES AND GLUCONATE

CROSS-REFERENCE TO RELATED APPLICATION

This application is a National Stage Entry of International Application No. PCT/KR2015/011182, filed Oct. 22, 2015, and claims the benefit of and priority to Korean Application No. 10-2014-0152059, filed on Nov. 4, 2014, all of which are hereby incorporated by reference in their entirety for all purposes as if fully set forth herein.

TECHNICAL FIELD

The present invention relates to a cement composition additive and more specifically, to a cement composition additive containing a polycarboxylic acid copolymer, zinc oxide particles and gluconate, and a cement composition.

BACKGROUND ART

Cement compositions including a cement paste prepared by mixing cement, water, other additives and the like, mortar prepared by adding sand thereto and concrete prepared by further adding large aggregates such as gravel to the cement paste and mortar are used in large amounts for a variety of construction materials and the like.

In general, the cement composition is a hydraulic reaction product which hardens upon hydration reaction between cement and water. As the cement composition begins to harden over time, causing deterioration in workability. In this regard, to improve workability, water may be further added. In this case, the total amount of water used is limited because the compressive strength of the cement composition is deteriorated and cracks occur. Accordingly, various cement additives have been developed to reduce the amount of water used and to maintain dispersibility of the cement composition.

Additives currently used for such a cement composition are high-functional AE water reducing agents such as naphthalene sulfonate formaldehyde condensates (based on naphthalene), melamine sulfonate formaldehyde condensates (based on melamine) and polycarboxylates (based on polycarboxylic acid).

Among them, organic acid compounds such as lignin, naphthalene, melamine or aminosulfone that are capable of satisfying strength by reducing the amount of water present in concrete have been conventionally used as cement composition additives and have been mixed with concrete, if necessary, in order to realize initial strength of concrete. However, such a conventional method cannot obtain an effect of increasing water reduction rate to a predetermined level or more in spite of increasing the amount used due to difficulty in control of water reduction rate and have problems of deterioration in dispersibility of cement particles, curing characteristics of cement and serious impacts on strength of concrete after curing.

Accordingly, recently, polycarboxylate compounds capable of exhibiting excellent water reduction capability in spite of addition in a small amount are generally used.

However, these polycarboxylate compounds have disadvantages of long curing delay and thus low production rate, as compared to naphthalene and melamine compounds, low workability and difficulty in control of curing rate, while they have advantages such as increase in compressive strength and reduction of cracks owing to decrease in amount of water used resulting from excellent water reduction capability.

Accordingly, there is an increasing need for technologies to ultimately overcome these disadvantages.

DISCLOSURE

Technical Problem

Therefore, the present invention has been made to solve the above and other technical problems that have yet to be resolved.

It is one object of the present invention to provide a cement composition that contains a polycarboxylic acid copolymer and/or a salt thereof, zinc oxide particles, and certain gluconic acid and/or a salt thereof in a predetermined mix ratio to secure optimal physical properties and obtain a high compressive strength, a suitable curing rate and thus improved workability.

It is another object of the present invention to provide a method of preventing deterioration in flowability of cement using the cement composition.

Technical Solution

In accordance with one aspect of the present invention, provided is a cement composition additive including a polycarboxylic acid copolymer and/or a salt thereof, zinc oxide particles, and gluconic acid and/or a salt thereof.

That is, the present invention can exhibit higher initial strength than when using only a conventional polycarboxylic acid copolymer, can remove a mold earlier during construction works and thus shorten a construction period and can reduce additional costs by using a polycarboxylic acid copolymer with high water reduction capability and zinc oxide particles as a cement composition additive, and can relieve a rapid curing rate and thereby improve workability by adding predetermined gluconic acid and/or a salt thereof.

In other words, zinc oxide particles secure initial strength and compressive strength, but result in excessively high curing rate. Accordingly, by adding gluconic acid and/or a salt thereof, curing rate can be reduced and workability can be improved.

Meanwhile, when the polycarboxylic acid copolymer and/or a salt thereof is contained, the polycarboxylic acid copolymer may be added to the cement composition without any treatment, or a copolymer salt obtained by neutralization with an alkaline substance may be added, if necessary.

In this case, the alkaline substance may include one or more selected from the group consisting of hydroxide, chloride, carbonate, ammonia and organic amine of a metal having an oxidation state of +1 or +2

The gluconic acid and/or a salt thereof may be contained in the form of gluconic acid or a salt thereof or a mixture thereof in the cement composition additive and is preferably added in the form of gluconate.

In this case, that is, when a salt of gluconic acid is contained in the cement composition additive, the salt of gluconic acid may be sodium gluconate or potassium gluconate and is preferably sodium gluconate in terms of cost and accessibility.

When the zinc oxide particles are added to the polycarboxylic acid copolymer and/or a salt thereof, they can relieve curing delay and improve compressive strength and may be used as a mixture with aluminum oxide, if necessary. In this case, a mix ratio of aluminum oxide nano-particles and zinc oxide nano-particles is not particularly limited so long as properties of the cement composition are not impaired and is 3:7 to 7:3 based on weight.

The zinc oxide particles may be zinc oxide nano-particles having a particle size of 1 nanometer to 100 nanometers. When the particle size is smaller than 1 nanometer, it is difficult to secure desired compressive strength, and when the particle size exceeds 100 nanometers, sufficient activity facilitating hydration of cement cannot be obtained and achievement of high strength is thus disadvantageously difficult.

In a specific embodiment, the polycarboxylic acid copolymer may be a copolymer of a monomer mixture containing an alkoxypolyalkylene glycol mono(meth)acrylic acid ester monomer and a (meth)acrylic acid monomer.

More specifically, the polycarboxylic acid copolymer may be a copolymer of a monomer mixture containing 60% by weight to 99% by weight of an alkoxypolyalkylene glycol mono(meth)acrylic acid ester monomer and 1% by weight to 40% by weight of a (meth)acrylic acid monomer, based on the total weight of the copolymer.

Copolymerization of the monomers within the range is highly effective in exerting superior dispersibility, slump maintenance and early dispersibility, and offering appropriate air entraining capability.

Specifically, examples of the alkoxypolyalkylene glycol mono(meth)acrylic acid ester monomer include one or more monomers selected from the group consisting of methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, and ethoxypolyethylene glycol polypropylene glycol polybutylene glycol mono(meth)acrylate.

Specifically, the (meth)acrylic acid monomer includes one or more monomers selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, and 2-ethylhexyl methacrylate, and monovalent metal salts, bivalent metal salts, ammonium salts and organic amine salts of these acids.

Meanwhile, the monomer mixture to prepare the polycarboxylic acid copolymer may further include polyoxyalkylene alkenyl ether sulfate. In this case, the polyoxyalkylene alkenyl ether sulfate may be included in an amount of 0.5 parts by weight to 92 parts by weight, specifically 5 parts by weight to 80 parts by weight, based on 100 parts by weight of the monomer mixture.

Specifically, the polyoxyalkylene alkenyl ether sulfate salt monomer includes one or more selected from the group consisting of: sulfoxypolyalkylene glycol allyl ethers, such as sulfoxypolyethylene glycol nonylphenylpropenyl ether, sulfoxypolyethylene glycol allyl ether, sulfoxypolypropylene glycol allyl ether, sulfoxypolybutylene glycol allyl ether, sulfoxypolyethylene glycol 2-butenyl ether, sulfoxypolypropylene glycol 2-butenyl ether, sulfoxypolybutylene glycol 2-butenyl ether, sulfoxypolyethylene glycol 3-butenyl ether, sulfoxypolypropylene glycol 3-butenyl ether, sulfoxypolybutylene glycol 3-butenyl ether, sulfoxypolyethylene glycol 3-pentenyl ether, sulfoxypolypropylene glycol 3-pentenyl ether, and sulfoxypolybutylene glycol 3-pentenyl ether; sulfoxypolyalkylene glycol alkylvinylphenyl ethers, such as sulfoxypolyethylene glycol (3-vinyl-5-methyl)phenyl ether, sulfoxypolypropylene glycol (3-vinyl-5-methyl)phenyl ether, sulfoxypolybutylene glycol (3-vinyl-5-methyl)phenyl ether, sulfoxypolyethylene glycol (3-vinyl-5-ethyl)phenyl ether, sulfoxypolypropylene glycol (3-vinyl-5-ethyl)phenyl ether, sulfoxypolybutylene glycol (3-vinyl-5-ethyl)phenyl ether, sulfoxypolypropylene glycol (3-propenyl-5-propyl) phenyl ether, sulfoxypolybutylene glycol (3-propenyl-5-propyl)phenyl ether, sulfoxypolyethylene glycol (3-propenyl-5-butyl)phenyl ether, sulfoxypolypropylene glycol (3-propenyl-5-butyl)phenyl ether, and sulfoxypolybutylene glycol (3-propenyl-5-butyl)phenyl ether; 2-sulfoxypolyalkylene glycol-3-(4-alkylphenoxyl)propylene allyl ethers, such as 2-sulfoxypolyethylene glycol-3-(4-methylphenoxyl) propylene allyl ether, 2-sulfoxypolypropylene glycol-3-(4-methylphenoxyl)propylene allyl ether, 2-sulfoxypolybutylene glycol-3-(4-methylphenoxyl)propylene allyl ether, 2-sulfoxypolyethylene glycol-3-(4-ethylphenoxyl)propylene allyl ether, 2-sulfoxypolypropylene glycol-3-(4-ethylphenoxyl)propylene allyl ether, and 2-sulfoxypolybutylene glycol-3-(4-ethylphenoxyl)propylene allyl ether; and monomers obtained by neutralizing the above-listed compounds with a monovalent metal (metal with a valence of +1), a divalent metal (metal with a valence of +2), an ammonium salt, or an organic amine.

The alkoxypolyalkylene glycol mono(meth)acrylic acid ester monomer and the polyoxyalkylene alkenyl ether sulfate have double bonds that can participate in radical reaction and can copolymerize with monomers to induce electrostatic repulsion between dispersed particles and impart stability, and thereby maintain slump flowability for a long time and minimize changes of the cement composition over time.

That is, the present invention can offer better dispersibility than conventional cement additives, can increase flowability of the cement composition in even high water reduction rate areas, can prevent deterioration of the obtained flowability over time for a long time and can continuously entrain an appropriate amount of air and thereby impart excellent workability to the cement composition, by using, as a cement additive, a polycarboxylic acid copolymer obtained by copolymerizing an alkoxypolyalkylene glycol mono (meth)acrylic acid ester monomer, an unsaturated polyalkylene glycol ether monomer, a (meth)acrylic acid monomer, a methacrylic acid ester monomer and polyoxyalkylene alkenyl ether sulfate. The polycarboxylic acid copolymer can be prepared by copolymerizing the monomer ingredients using a polymerization initiator and the copolymerization may be carried out by a method such as solution polymerization or bulk polymerization and is not particularly limited thereto.

For example, a water-soluble polymerization initiator such as persulfate of ammonium or an alkali metal, or hydrogen peroxide may be used as a solution polymerization initiator for polymerization using water as a solvent, and a polymerization initiator such as hydroperoxide including benzoyl peroxide, lauroyl peroxide or cumene hydroperoxide, or an aromatic azo compound such as azobisisobutyronitrile may be used for polymerization using lower alcohol, aromatic hydrocarbon, aliphatic hydrocarbon, an ester compound or a ketone compound as a solvent. In this case, an enhancer such as an amine compound may be in combination with it. In addition, when a mix solvent of water and lower alcohol is used, a polymerization initiator may be suitably selected from combinations of various polymerization initiators or polymerization initiators with enhancers.

The appropriate amount of used polymerization initiator specifically may be 0.5 parts by weight to 7 parts by weight, based on 100 parts by weight of the monomer mixture and the polymerization temperature may be specifically selected from 0° C. to 120° C. depending on used solvent or type of polymerization initiator.

In addition, to control the molecular weight of the obtained polycarboxylic acid copolymer, a thiol-based chain transfer agent may be used as well. The thiol-based chain transfer agent may include one or more compounds selected from the group consisting of mercaptoethanol, thioglycerol, thioglycolic acid, 2-mercaptopropionic acid, 3-mercaptopropionic acid, thiomalic acid, octyl thioglycolate, and octyl 3-mercaptopropionate. The amount of thiol-based chain transfer agent used may be specifically 0.01 part by weight to 7 parts by weight based on 100 parts by weight of the monomer mixture.

In a specific embodiment, when taking into consideration dispersibility, specifically, the polycarboxylic acid copolymer and a salt of the copolymer obtained by neutralization of the same may have a weight average molecular weight, measured in accordance with gel permeation chromatography (GPC), of 30,000 to 70,000, more specifically, 40,000 to 60,000.

Meanwhile, the present invention provides an optimal mix ratio of a cement composition with excellent physical properties using an additive including the polycarboxylic acid copolymer, zinc oxide particles and gluconate.

That is, the present invention provides, as a cement composition including the cement composition additive, a cement composition containing a polycarboxylic acid copolymer and/or a salt thereof, zinc oxide particles, gluconic acid and/or a salt thereof, and cement.

In this case, the polycarboxylic acid copolymer may be present in an amount of 0.05 parts by weight to 1 part by weight, with respect to 100 parts by weight of the cement.

In addition, the gluconic acid and/or a salt thereof may be present in an amount of 1 part by weight to 7 parts by weight, specifically, 2 parts by weight to 6 parts by weight, with respect to 100 parts by weight of the cement.

When the gluconic acid and/or a salt thereof is present in an amount of less than 1 part by weight, out of the range defined above, it is disadvantageously difficult to obtain desired workability due to rapid curing. On the other hand, when the gluconic acid and/or a salt thereof is present in an amount exceeding 7 parts by weight, the gluconic acid and/or a salt thereof causes hydration delay, disadvantageously resulting in high air amount and low compressive strength.

That is, in order to improve compressive strength of the cement composition and facilitate workability, zinc oxide particles that fill pores and thereby reduce porosity and gluconic acid and/or a salt thereof should be added in an appropriate ratio.

Meanwhile, the cement may be Portland cement. Portland cement is hydraulic cement that hardens upon reacting with water, which is prepared by mixing ingredients including silica, alumina, iron oxide and lime in an appropriate ratio, adding a predetermined amount of plaster to clinker having been sintered until a part thereof is melted and grinding the mixture into a powder.

The Portland cement may be made of one or more selected from the group consisting of limestone, clay, ganister, marble and pyrite.

In addition, depending on application, the Portland cement may be classified into ordinary Portland cement, moderate heat Portland cement and high initial strength Portland cement, and these Portland cements are divided in accordance with Korean Industrial Standards KSL 5201.

Besides, Portland cement may include, but are not limited to, one or more selected from the group consisting of low heat Portland cement, high sulfate resistant Portland cement and white Portland cement.

The present invention also provides a mortar composition including the cement composition, sand and water. The cement composition is added to water to form a cement paste, and sand as fine aggregate is added to the cement paste to produce a mortar. The mortar may be used in all architecture works including construction, specifically plaster materials, surface finishing and the like.

The present invention also provides a method of preventing deterioration in flowability of a cement composition including adding an additive including: a polycarboxylic acid copolymer and/or a salt thereof obtained by neutralizing the polycarboxylic acid copolymer with an alkaline substance; zinc oxide particles; and gluconate to prepare a cement composition, and continuously entraining air to the cement composition.

Here, the amount of continuously entrained air is not particularly limited, and specifically, unhardened concrete may be present in an amount of 1% to 9%, more specifically, 3% to 5%, based on the total weight of air and the cement composition.

The present invention also provides a concrete composition prepared by adding rubble as coarse aggregate to the cement composition, sand and water. A method of preparing the concrete composition is well-known in the art and a detailed explanation thereof will thus be omitted.

BEST MODE

Now, the present invention will be described in more detail with reference to the following examples. These examples are provided only to illustrate the present invention and should not be construed as limiting the scope and spirit of the present invention.

In addition, in the following Example, ingredients constituting the cement composition are designated by trade names of certain manufacturers and detailed information associated therewith can be obtained from the respective products.

Example 1

A cement composition including 0.2 parts by weight of a water-soluble polycarboxylic acid copolymer (LG Chem. Ltd., under the trade name of CP-WRM50), 3 parts by weight of zinc oxide nano-particles, and 2 parts by weight of sodium gluconate, with respect to 100 parts by weight of cement was prepared.

Example 2

A cement composition was prepared in the same manner as Example 1, except that the amount of the sodium gluconate added was 4 parts by weight, with respect to 100 parts by weight of the cement.

Example 3

A cement composition was prepared in the same manner as Example 1, except that the amount of the sodium gluconate added was 6 parts by weight, with respect to 100 parts by weight of the cement.

Comparative Example 1

A cement composition was prepared in the same manner as Example 1, except that sodium gluconate was not added.

Comparative Example 2

A cement composition was prepared in the same manner as Example 1, except that zinc oxide nano-particles were not added and the amount of sodium gluconate added was 4 parts by weight, with respect to 100 parts by weight of the cement.

Reference Example 1

A cement composition was prepared in the same manner as Example 1, except that the amount of sodium gluconate added was 8 parts by weight, with respect to 100 parts by weight of the cement.

The main ingredients of cement compositions prepared in Examples, Comparative Examples and Reference Example are shown in Table 1 below.

TABLE 1

| Item | Amount of CP-WRM50 Added (parts by weight) | Amount of ZnO$_2$ Added (parts by weight) | Amount of sodium gluconate Added (parts by weight) |
|---|---|---|---|
| Example 1 | 0.2 | 3 | 2 |
| Example 2 |  |  | 4 |
| Example 3 |  |  | 6 |
| Comparative Example 1 | 0.2 | 3 | 0 |
| Comparative Example 2 |  | 0 | 4 |
| Reference Example 1 | 0.2 | 3 | 8 |

Test Example 1

Mortar Flowability Test 665 g of ordinary Portland cement (produced by Ssangyong Cement Industrial Co., Ltd.), 1,350 g of sand (standard sand), 332.5 g of water (service water) and each of the cement compositions prepared in Examples, Comparative Examples and Reference Example were kneaded at a medium rate in a mortar mixer for 3 minutes to prepare mortars.

The respective prepared mortars were charged in empty cones having a diameter of 60 mm and a height of 40 mm and the cones were removed vertically. A mortar flow value (mm) was defined as an average of mortar diameter values measured in two directions and a length decreased in a vertical direction was measured. Results are shown in Table 2 below.

TABLE 2

| Items | Mortar flow value (mm) Initial stage | Mortar flow value (mm) After 30 min | Concrete slump (mm) Initial stage | Concrete slump (mm) After 30 min |
|---|---|---|---|---|
| Example 1 | 160 | 142 | 215 | 190 |
| Example 2 | 162 | 151 | 215 | 195 |
| Example 3 | 163 | 152 | 220 | 205 |
| Comparative Example 1 | 159 | 127 | 215 | 140 |
| Comparative Example 2 | 161 | 150 | 215 | 200 |
| Reference Example 1 | 162 | 158 | 220 | 210 |

As can be seen from Table 2, Examples 1 to 3 and Reference Example 1 including zinc oxide particles and sodium gluconate exhibit similar sodium mortar flow value and concrete slump in an initial stage to Comparative Example 1 not including sodium gluconate, while a significant difference in mortar flow value and concrete slump after 30 min therebetween is observed.

That is, as compared to Examples 1 to 3 and Reference Example 1 including sodium gluconate, Comparative Example 1 not including sodium gluconate exhibits remarkably deteriorated workability because cement or concrete hardens before handled due to excessively high curing rate.

Meanwhile, Comparative Example 2 including only sodium gluconate with a polycarboxylic acid copolymer exhibits similar flowability and slump values and thus superior workability to Examples and Reference Example, but have problems of excessively thin concrete paste and severe separation of ingredients.

That is, when sodium gluconate is added, it prevents zinc oxide nano-particles from being rapidly cured, thereby maintaining excellent workability.

Test Example 2

Concrete Test 3.53 kg of ordinary Portland cement (produced by Ssangyong Cement Industrial Co., Ltd.), 7.94 kg of sand (standard sand), 10.01 kg of rubble, 1.66 kg of water (service water) and each of the cement compositions prepared in Examples, Comparative Examples and Reference Example were kneaded to prepare concretes.

The slump, amount of air and compressive strength of respective prepared concretes were measured in accordance with Korean Industrial Standards KSF 2402 and KSF 2449.

TABLE 3

| Item | Amount of air (%) Initial stage | Amount of air (%) After 30 min | Compressive strength (MPa) 3 days | Compressive strength (MPa) 7 days | Compressive strength (MPa) 28 days |
|---|---|---|---|---|---|
| Example 1 | 3.4 | 3.0 | 15 | 20 | 34 |
| Example 2 | 3.5 | 3.1 | 18 | 25 | 40 |
| Example 3 | 3.7 | 3.0 | 17 | 24 | 38 |
| Comparative Example 1 | 3.5 | 2.7 | 16 | 21 | 35 |
| Comparative Example 2 | 4.8 | 4.6 | 16 | 22 | 37 |

TABLE 3-continued

| Item | Amount of air (%) Initial stage | Amount of air (%) After 30 min | Compressive strength (MPa) 3 days | Compressive strength (MPa) 7 days | Compressive strength (MPa) 28 days |
|---|---|---|---|---|---|
| Reference Example 1 | 4.9 | 4.4 | 12 | 18 | 31 |

Examples 1 to 3 and Comparative Example 1 are similar in terms of the amount of air and compressive strength of concrete shown in Table 3 and Example 2 exhibits high compressive strength over time. This is considered to be due to effects of sodium gluconate on hydration delay and mutual effects of zinc oxide particles.

On the other hand, Comparative Example 2 not including zinc oxide particles exhibits similar workability to Test Example 1, but disadvantageously has excessively high amount of air.

Meanwhile, Reference Example 1 exhibits improved workability due to addition of zinc oxide particles and a slightly great amount of sodium gluconate, but exhibits high amount of air and low compressive strength. That is, when the amount of sodium gluconate added exceeds 6 parts by weight, with respect to 100 parts by weight of the cement, curing of specimens is delayed due to hydration delay of sodium gluconate, control of concrete mixing is difficult and compressive strength is lowered.

Accordingly, sodium gluconate is preferably added in an amount not causing deterioration in compressive strength and an optimal content of sodium gluconate facilitating workability is preferably 1 part by weight to 7 parts by weight, specifically 2 parts by weight to 6 parts by weight, most preferably, 4 parts by weight, with respect to 100 parts by weight of the cement, as shown in Example 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the fore-going, the present invention can increase flowability of the composition and thereby obtain enhanced workability and high compressive strength, and can potently prevent deterioration of the cement composition over time even in high water reduction areas of particles by using a cement composition additive prepared by incorporating zinc oxide particles, and gluconic acid and/or a salt thereof in a polycarboxylic acid copolymer and/or a salt thereof.

The invention claimed is:

1. A cement composition comprising:
a polycarboxylic acid copolymer and/or a salt thereof;
zinc oxide;
gluconic acid and/or a salt thereof; and
cement;
wherein the gluconic acid and/or a salt thereof is present in an amount of 2 parts by weight to 7 parts by weight, with respect to 100 parts by weight of the cement.

2. The cement composition according to claim 1, wherein, when the cement composition comprises a salt of a polycarboxylic acid copolymer, the salt of the polycarboxylic acid copolymer is obtained by neutralizing the polycarboxylic acid copolymer with an alkaline substance.

3. The cement composition according to claim 2, wherein the alkaline substance comprises one or more selected from the group consisting of hydroxides, chlorides, carbonates, ammonia and organic amines of a metal having an oxidation number of +1 or +2.

4. The cement composition according to claim 1, wherein, when the cement composition comprises a salt of gluconic acid, the salt of gluconic acid is sodium gluconate or potassium gluconate.

5. The cement composition according to claim 4, wherein the salt of gluconic acid is sodium gluconate.

6. The cement composition according to claim 1, wherein the polycarboxylic acid copolymer is a copolymer of a monomer mixture comprising an alkoxypolyalkylene glycol mono(meth)acrylic acid ester monomer and a (meth)acrylic acid monomer.

7. The cement composition according to claim 6, wherein the polycarboxylic acid copolymer is a copolymer of a monomer mixture comprising 60% by weight to 99% by weight of an alkoxypolyalkylene glycol mono(meth)acrylic acid ester monomer and 1% by weight to 40% by weight of a (meth)acrylic acid monomer, based on the total weight of the copolymer.

8. The cement composition according to claim 6, wherein the monomer mixture further comprises polyoxyalkylene alkenyl ether sulfate.

9. The cement composition according to claim 1, wherein the polycarboxylic acid copolymer has a weight average molecular weight of 30,000 to 70,000.

10. The cement composition according to claim 1, wherein the polycarboxylic acid copolymer is present in an amount of 0.05 parts by weight to 1 part by weight, with respect to 100 parts by weight of the cement.

11. The cement composition according to claim 1, wherein the gluconic acid and/or a salt thereof is present in an amount of 2 part by weight to 6 parts by weight, with respect to 100 parts by weight of the cement.

12. The cement composition according to claim 1, wherein the cement is Portland cement.

13. The cement composition according to claim 12, wherein the Portland cement is made of one or more selected from the group consisting of limestone, clay, ganister, marble and pyrite.

14. The cement composition according to claim 12, wherein the Portland cement comprises one or more selected from the group consisting of ordinary Portland cement, moderate heat Portland cement, high initial strength Portland cement, low heat Portland cement, high sulfate resistant Portland cement and white Portland cement.

15. A mortar composition comprising the cement composition according to claim 1, sand and water.

16. A method of preventing deterioration in flowability of the cement composition according to claim 15, the method comprising:
supplying an additive including:
a polycarboxylic acid copolymer and/or a salt of the copolymer obtained by neutralizing the copolymer with an alkaline substance;
zinc oxide nano-particles and
gluconate to prepare a cement composition, wherein the gluconic acid and/or a salt thereof is present in an amount of 2 parts by weight to 7 parts by weight, with respect to 100 parts by weight of the cement; and
continuously entraining air to the cement composition.

17. A concrete composition comprising the cement composition according to claim 1, sand, rubble and water.

\* \* \* \* \*